(12) United States Patent
Nebendahl

(10) Patent No.: US 7,312,435 B2
(45) Date of Patent: Dec. 25, 2007

(54) DETERMINATION OF A PHYSICAL STATE OF AN OPTICAL DEVICE

(75) Inventor: Bernd Nebendahl, Ditzingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 194 days.

(21) Appl. No.: 11/105,697

(22) Filed: Apr. 14, 2005

(65) Prior Publication Data

US 2005/0230607 A1    Oct. 20, 2005

(30) Foreign Application Priority Data

Apr. 16, 2004   (EP) ................. 04101584

(51) Int. Cl.
*G01J 1/04* (2006.01)
*G01J 1/42* (2006.01)
*G01J 5/08* (2006.01)

(52) U.S. Cl. .................. 250/227.14; 250/227.18; 250/237 R; 385/13; 398/13

(58) Field of Classification Search .......... 250/227.14, 250/227.18, 227.23, 237 R, 237 G; 385/12–13; 356/477, 482, 484, 502; 398/13, 20–24, 398/43–51
See application file for complete search history.

(56) References Cited

U.S. PATENT DOCUMENTS

| | | | |
|---|---|---|---|
| 4,632,551 A | | 12/1986 | Pavlath |
| 5,493,390 A | * | 2/1996 | Varasi et al. .................. 356/32 |
| 5,696,858 A | * | 12/1997 | Blake ........................... 385/12 |
| 5,798,521 A | | 8/1998 | Froggatt |
| 6,204,920 B1 | | 3/2001 | Ellerbrock et al. |
| 6,449,047 B1 | | 9/2002 | Bao et al. .................. 356/478 |
| 6,571,027 B2 | * | 5/2003 | Cooper et al. ............... 385/12 |
| 6,878,926 B2 | * | 4/2005 | Martinez et al. ....... 250/227.14 |

* cited by examiner

*Primary Examiner*—Georgia Epps
*Assistant Examiner*—Patrick J. Lee

(57) ABSTRACT

The present invention relates to a determination of a physical state of an optical device by measuring a response signal.

At least two subsequent measurements are executed. Therefore, a first optical signal is transmitted to the optical device, wherein a first optical property of said first signal is varied according to a first function of the time. A second optical property of a first response signal returning from the optical device is measured over the time and a first result function of the second optical property of the first response signal over the first optical property of first optical signal is established. Further, a second optical signal is transmitted to the optical device, wherein the first optical property of said signal is varied according to a second function of the time that is different from the first function of time. The second optical property of the corresponding second response signal is measured and a second result function of the second optical property of the response signal over the first optical property of the transmitted optical signal is established. The physical state of the optical device is determined on the base of a combination of the first and second result functions.

15 Claims, 3 Drawing Sheets

DETERMINATION OF A PHYSICAL STATE OF AN OPTICAL DEVICE

BACKGROUND OF THE INVENTION

The present invention relates to a determination of a physical state of an optical device by measuring a response signal.

Optical devices showing response characteristics dependent on a physical state, e.g. the temperature, pressure, strain or mechanical force are widely used within optical systems. Often, such characteristics variations are unwanted and thus measurements are taken to reduce the effects of the variations or to measure such variations.

Optical devices with wavelength dependent characteristics, especially Fiber Bragg Gratings (FBG), Fabry Perot Filters or Etalons, are employed in a variety of engineering and environmental sensing applications. The wavelength response characteristics of those devices depend on their physical states caused by environmental conditions at those devices. Changes of the physical state can therefore be determined by analyzing a returned signal.

U.S. Pat. No. 6,449,047 discloses a tunable laser with an accurately calibrated wavelength output which can be rapidly scanned or swept over a selected wavelength band. Such lasers may generate wavelengths in the 1550 nm range and can be swept over about 50 nm. These lasers are used as components of sensor interrogator systems, which determine the power of reflected or transmitted by Fiber Bragg Gratings (FBG) depending on the wavelength of an incident beam.

SUMMARY OF THE INVENTION

It is an object of the invention to provide an improved determination of a physical state of a remote optical device by means of measuring signals returned from the remote device. The object is solved by the independent claims. Preferred embodiments are shown by the dependent claims.

A physical state having influence on the reflection characteristics, e.g. temperature, pressure, strain or a mechanical force, can in principle be determined by measuring a second optical property of a return signal in dependence of a first optical property of the corresponding incident beam, wherein the first optical property is varied during the measurement over a determined range, This physicals property can e.g. be determined by comparing this result with reference results. However, it is difficult to measure the first optical property at the second optical property at exactly the same time. Time shifts between said properties lead to wrong comparison results.

According to the present invention, at least two subsequent measurements are executed. Therefore, a first optical signal is transmitted to the remote device, wherein a first optical property of said first signal is varied according to a first function of the time. A second optical property of the first response signal is measured over the time and a function between the second optical property of the response signal and he first optical property of the transmitted optical signal is established; i.e. the second optical property is determined as function of the first optical property. Further, a second optical signal is transmitted to the remote device, wherein the first optical property of said signal is varied according to a second function of the time that is different from the first function of time. The second optical property of the corresponding second response signal is measured and again a function between the second optical property of the response signal and the first optical property of the transmitted optical signal is established.

Due to time delay effects in determining the second optical property the functions show each a shift between the first and the second optical property that is depending on the variation functions. The functions are combined such, that the time shifts of both measurements counteract each other and in the best case cancel out each other. Thus, for an optimum choice of variation functions, the determination of the physical state is substantially free from deviations due to said time shift effects of single measurements.

The invention has the advantage, that measurements of the first optical property over the time and the seconds optical property over the time can be related to each other without caring about delays or shifts, e.g. delays due to a propagation time of the optical signal or an unknown detection or processing time within a measurement setup. There is no complicated device necessary for adjusting those property functions to each other.

In an embodiment of the invention a combination of the first and the second function is performed by determining a first center value of at least a part of the first function and a second center value of at least part of the second function and determining a resulting center value in dependence of said first and second center values.

In a further embodiment, the first and second function of time are chosen to describe each a substantially linear relation between the first optical property resulting in substantially constant variation speeds, also referred to as sweep speeds, wherein the variation speeds have the same absolute value and different signs. In this case the time delay effects result in wavelength shifts with the same absolute value and different signs for both functions. Thus, in the resulting center value determined by the average value of both single center values, no resulting wavelength shift occurs; i.e. through the combination of both measurements, the wavelength shifts are eliminated.

Alternatively, the resulting center value is determined by superimposing both first and second measurements results and determining the center value of the superimposed measurements.

In a further embodiment, said first and second function of time describe each a substantially linear relationship between the first optical property and the time resulting in substantially constant variation speeds but do not necessarily have the same absolute value and different signs. The center value is generally determined according to the following equation:

$$GR = \frac{C2 \cdot G1 - C1 \cdot G2}{C2 - C1},$$

wherein GR is the resulting center value, G1 is the first center value, G2 is the second center value, C1 is the first variation speed, C2 is the second variation speed.

In a further embodiment, a comparison is carried out between the resulting center value and a reference center value derived from known reflection characteristics of the remote device at a reference physical state. The physical state of the remote device is preferably determined by evaluating the distance between the resulting center value and the reference center value and wherein the physical state is determined as function of an absolute value assigned to the reference center value and a relative value dependent on the distance between said centers.

The center values representing characteristic values of the physical state of the device can be determined by various methods. One method for determining a center value is to determine the midpoint by establishing each two intersection points of the corresponding part of a function of the second optical property over the first optical property (e.g. a region around a characteristic function peak) and a horizontal line representing a constant value, e.g. a so-called 3 dB line representing a medium value between the minimum and maximum values of the measured second optical property. The midpoint is determined by the mid value between the two intersection points.

Alternatively, a center value is determined by a convolution between a corresponding function of said corresponding function part and a reference function.

Further alternatively, a center of mass, also known as center of gravity or centroid, is determined by calculating the first momentum of that part of said corresponding function part that is above a defined fraction of the maximum value of the second optical property (e.g. a 3 dB horizontal line).

Further alternatively, the center value is determined by taking the maximum of said corresponding function part.

In a further embodiment, the first optical property is the wavelength of the first and second optical signal and the second physical property is the power of the signals returned from the remote device. Alternatively, the first optical property is the polarization of the emitted optical signals, wherein the rotation an/or the polarization plane are varied by a function of time.

In a further preferred embodiment, the remote device is one of a Fiber Bragg Grating, a Fabry Perot Interferometer or a Michelson Interferometer.

The physical state to be measured can be any environmental conditions, e.g. temperature, pressure, strain or a mechanical force, that is applied to the remote device.

In a further embodiment, the evaluation for determining a physical state of a remote optical device is carried out in an evaluation unit, that receives first optical property information about each a first and a second optical signal coupled to a remote device, second optical property information about each a correspondingly first and a second returned optical signals from the remote device and relates the first and the second information for each the first and the second measurement into functions of the second optical property over the first optical property. The physical state is then determined by combining the established functions such that the effects of time shifts within the first and the second function are at least significantly reduced.

The invention can be partly or entirely embodied or supported by one or more suitable software programs, which can be stored on or otherwise provided by any kind of data carrier, and which might be executed in or by any suitable data processing unit. Software programs or routines are preferably applied for the evaluation of measurement results in the evaluation unit. The evaluation unit can be a computer or an oscilloscope comprising a processing unit and a storage device. The storage device stores both reference data for performing comparisons between measured values and reference values an a software program for performing the reception of information from the devices of a setup for measuring the physical state, the establishment of relating the optical properties to each other and the comparison between measured data and reference data.

BRIEF DESCRIPTION OF THE DRAWINGS

Other objects and many of the attendant advantages of the present invention will be readily appreciated and become better understood by reference to the following detailed description when considering in connection with the accompanied drawing(s). Features that are substantially or functionally equal or similar will be referred to with the same reference sign(s).

MORE DETAILED DESCRIPTION OF PREFERRED EMBODIMENTS ACCORDING TO THE INVENTION

Figure 1:
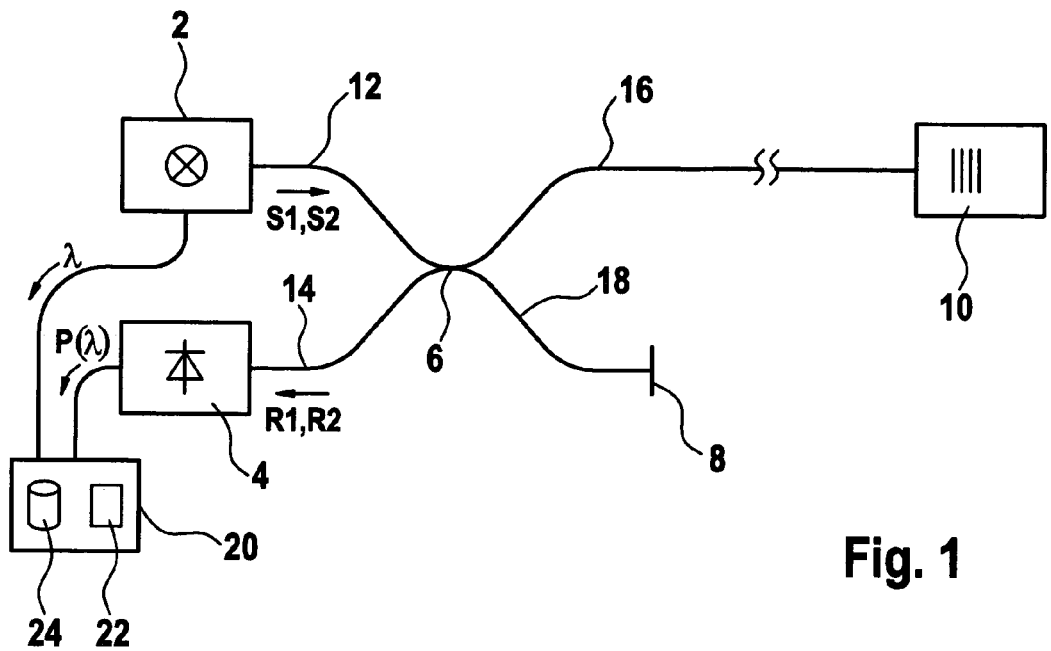
FIG. 1 shows a measurement setup according to the invention with an evaluation unit according to the invention.

FIG. 1 shows a measurement setup comprising a tunable light source 2, an optical power detector 4, an evaluation unit 20, an optical coupler 6, an optical termination 8 located nearby, e.g. in a measurement unit, and a remote optical element 10. Optical coupler 6 has four connections, wherein the firstconnection is connected over a first optical fiber 12 with tunable light source 2, the second connector is connected over a second optical fiber 14 with power detector 3, the third connector is connected over a third optical fiber 16 with optical element 10 and the fourth connector is connected over a fourth optical fiber 18 with termination 8. Termination 8 can be realized as any other non-reflective fiber end. The light from the fourth port can be used for other purposes, e.g. for measuring the power or wavelength or both of it of the source 2 Further, evaluation unit 20 is connected both with tunable light source 2 and optical detector 4 and possibly the termination 8, receiving a wavelength over time signal λ(t), further also referred to as first information from tunable light source 2 and a power over time signal P(t) or a power ratio P(t) determined by the signals from detector 4 and termination 8 also referred to as second information from optical detector 4. Evaluation unit 20 comprises a processing unit 22 and a storage unit 24.

Tunable light source 2 can be any kind of source that generates a light beam of with a narrow line width compared to the width of the wavelength dependence of the optical device, i.e. a beam with a sharp wavelength peak, wherein the wavelength can be varied or swept between a minimum value and a maximum value. Preferably, a light source is used wherein the wavelength can be varied at high speed with a substantially constant variation speed. As preferred light source, a tunable laser is used. Optical element 10 is preferably a Fiber Bragg Grating (FBG).

FBG's are environmentally temperature stable and mechanically robust. Thus, an FBG is preferably used as temperature sensor located in a drill hole with high temperatures and difficult environmental conditions.

Alternatively, optical coupler 6 may be replaced by an optical circulator connecting tunable light source 2, optical element 10 and detector 14 so that the light received from tunable light source 2 is directed to remote optical element 10 and the light received from remote device 10 is directed to detector 4.

Tunable light source emits a first optical signal S1 over first fiber 12, coupler 6 and third fiber 16 to optical element 10. During the emission of the first optical signal, the wavelength is varied at a substantially constant first rate or speed from a minimum value to a maximum value according to a first function of the time. Optical element 10 reflects a portion of the incident signal back to detector 4 over third optical fiber 16, coupler 6 and second optical fiber 14. Detector 4 detects the power over the time of the first received signal R1. Subsequently after termination of optical signal 1, tunable light source emits second optical signal S2 and detector 4 accordingly detects the power of the second received signal R2. During the emission of the second optical signal, the wavelength is varied at a substantially constant second rate or speed from the maximum value back to the minimum value wherein the first and second rate have the same absolute value and different signs.

Evaluation unit 20 receives from tunable light source 2 first information λ(t) that refers to the actual wavelength of the emitted light at emission time. Therefore tunable laser 2 comprises a wave meter that measures the wavelength of the emitted light and sends this information to evaluation unit 4. Alternatively to the use of a wave meter, first information λ(t) can be derived on the base of control signals that are used for controlling tunable light source 2. Further, evaluation unit 20 receives from detector 4 second information that refers to the power of the detected signal at receiving time. Evaluation unit 20 combines or relates both first and second information into a function of the power of the received optical signal over the wavelength of the emitted signal. This is carried out for each of the two measurements and thus two power functions over wavelength are determined.

As long as no time delay occurs between sending optical signals S1 or S2 and detecting the power of received optical signals R1 or R2, both functions of the power over the wavelength are similar since characteristics of optical element do not change significantly during the measurement. However, with increasing distance between tunable light source 2 and optical element 10, the emission time differs from the receiving time. This results in a time shift between both information P(t) and λ(t) and thus in a wavelength shift of the functions of the power over wavelength depending on the variation of the wavelength. Since the variations are inverse to each other, the first wavelength shift has a same absolute value and an opposite direction compared to the second wavelength shift. Thus, a combination of both functions, e.g. a superposition, eliminates the wavelength shifts of both measurements.

Alternatively to the wavelength determination in the tunable light source, a start signal at the emission start can be transmitted from the light source to the evaluation unit. Evaluation unit 10 then calculates the wavelength over time information on the base of the start time, the starting wavelength and a determined wavelength variation (sweep speed). However, wavelength variation has to be known very precisely in evaluation unit 10, The optical element 10 has a defined wavelength characteristics that determines the portion reflected to detector 4. The wavelength characteristics of optical element 10 change depending on the environmental temperature. Evaluation unit 20 determines the temperature on the base of the combination of the two functions and a reference function. Further details are described under FIG. 3.

Figure 2:
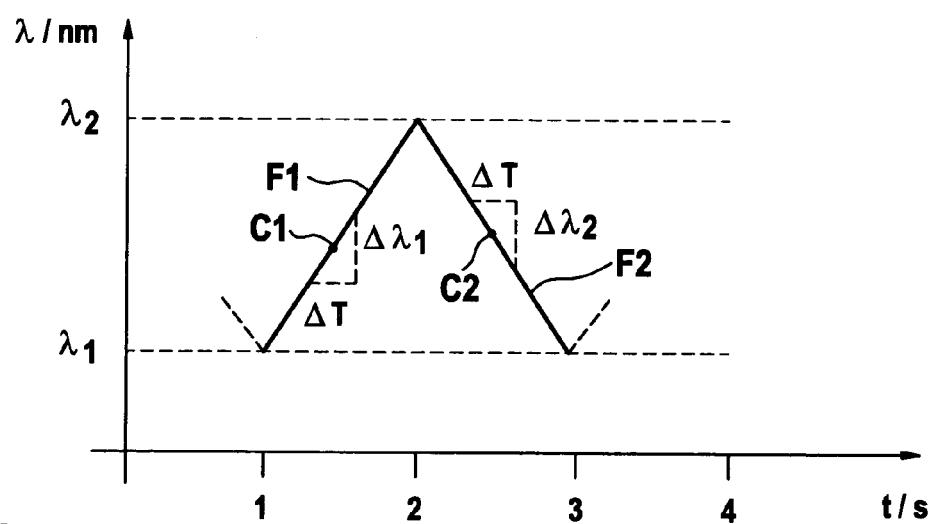
FIG. 2 shows a diagram depicting exemplary functions of wavelength over time for signals generated by a tunable light source.

FIG. 2 shows a diagram with exemplary wavelength over time functions F1, further referred to as variation functions F1 and F2 for first and second optical signals S1 and S2 described under FIG. 1. At the x-axis or abscissa, the time is depicted in seconds (s) and at the y-axis or ordinate, the wavelength is depicted in nanometer (nm). First variation function F1 is a curve at a constant wavelength rate between a first point defined by 1s and minimum wavelength λ1 at 1500 nm and a second point defined by 2s and a maximum wavelength λ2 at 1600 nm. Second variation function F2 is a curve at a constant wavelength rate between the second point and a third point defined by 3s and minimum wavelength λ1 at 1500 nm.

The first wavelength rate or speed C1 is derived from the ratio between a first wavelength difference Δλ1 over an infinitesimal time distance ΔT within the first time period between 1s and 2s. The second wavelength rate or speed C2 is derived from the ratio between a second wavelength difference Δλ2 over the infinitesimal time distance ΔT within the second time period between 2s and 3s. By way of example, both speeds have the same absolute value of 100 nm/s ad different signs.

Decreasing the sweep speed results in more accurate matching of the wavelength and the power on the one hand but in an increasing noise on the other hand due to variations of the transmission properties of the optical fiber. Moreover, if the sweeping speed is slow, dynamic changes of the physical property within the sweeping time have possibly to be taken into account. In addition the update rate of the measurement is slower for a slower sweep speed.

Figure 3:
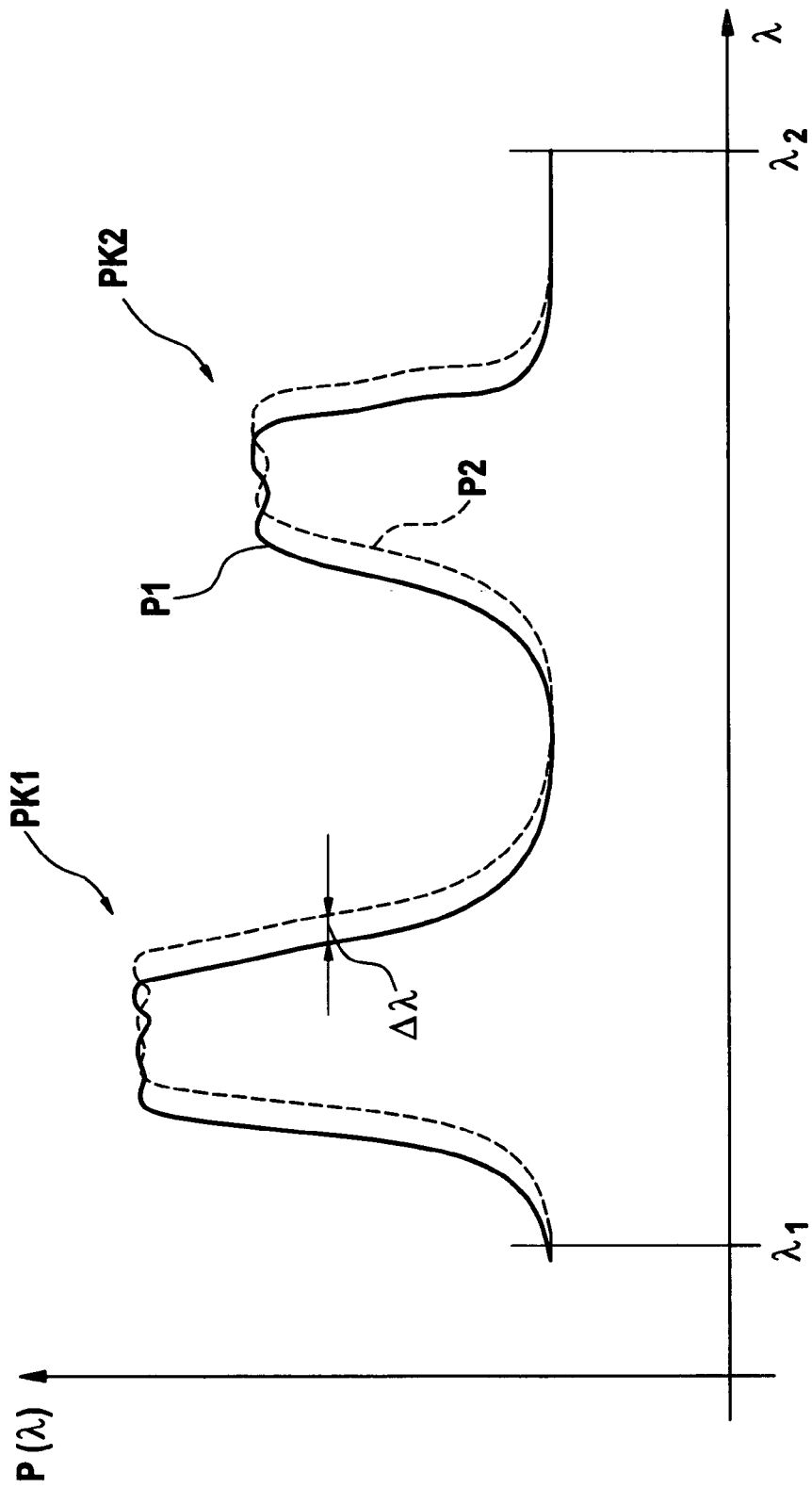
FIG. 3 shows a diagram depicting exemplary functions of power over wavelength for two detected signals determined in the evaluation unit and FIG. 4 shows a part of the diagram of FIG. 3 with each one peak of the functions and center values of them.

FIG. 3 shows exemplary measurement results. At the abscissa, a wavelength λ is depicted, and at the ordinate, a power over wavelength P(λ) is depicted. A first result function P1 and a second result function P2 stretch between minimum wavelength λ1 and maximum wavelength λ2, both exhibiting two prominent peaks PK1 and PK2. First result function P1 differs from second result function P2 only in that they are shifted to each other with a wavelength shift Δλ. Result functions P1 and P2 correspond to variation functions F1 and F2 of FIG. 2.

Figure 4:
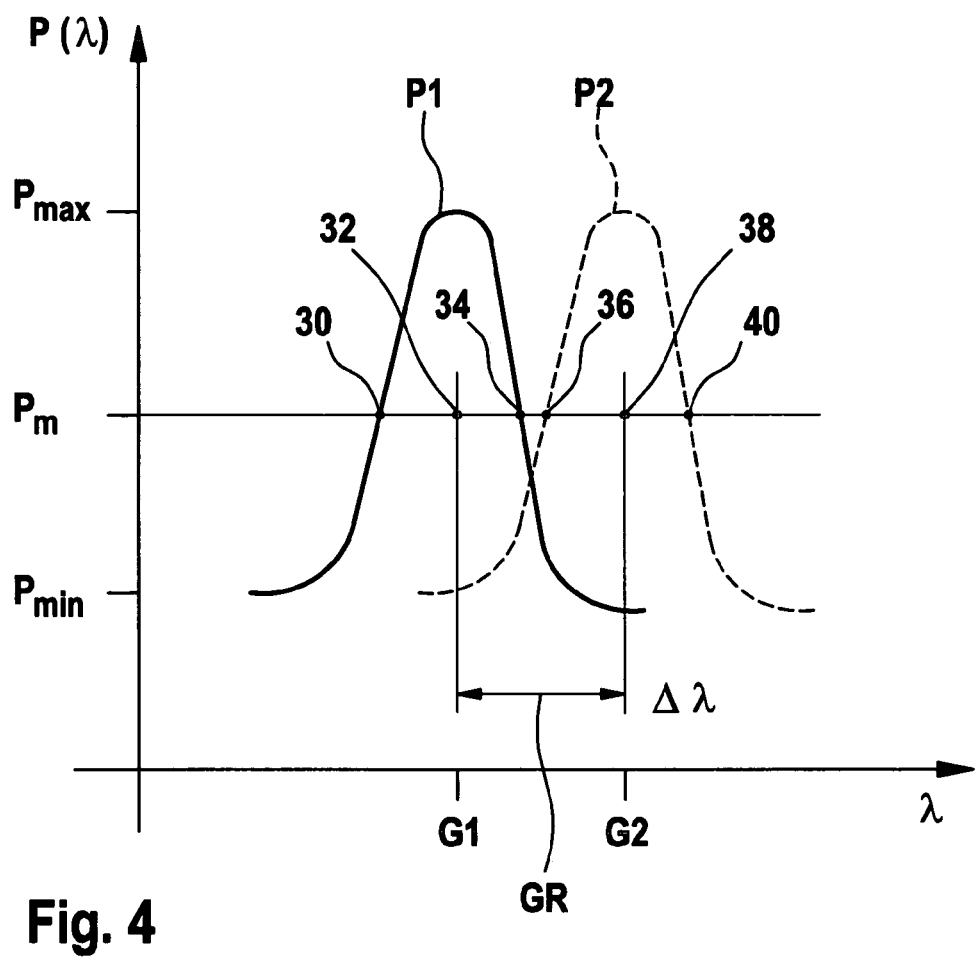

Depending on the characteristics of the optical element 10, a defined number of peaks PK1 and PK2 might occur as power result. However, it is not necessary to evaluate the whole result functions. One characteristic peak is chosen for further evaluation. FIG. 4 therefore shows a part of the diagram of FIG. 3 exemplary focusing on the first peak PK1. The result functions are drafted out of scale for better demonstrating the evaluation of center values G1, G2 and GR. Further, a horizontal line assigned to a constant power value Pm is depicted wherein Pm is the medium power between a minimum power Pmin and maximum power Pmax.

First and second center values G1 and G2 are determined by establishing first two intersection points 30 and 34 and second two intersection points 36 and 40 and each taking the medium 32 and 36 between said pairs of intersection points. In an ideal case, the distance between the center values is similar to the wavelength shift Δλ of FIG. 3. The resulting center value GR is determined as the medium between both the fist center value G1 and the second center value G2.

An advantage of considering only a part of the result function is that only a reduced amount of data needs to be captured and stored in evaluation unit 4

Repeatedly sweeping the wavelength of the emitted light forwards and backwards and averaging, or otherwise statistically analyzing, the measured results can further increase the measurement accuracy.

The invention claimed is:

1. A method of determining a physical state of an optical device with the steps of:

coupling a first optical signal to the optical device, wherein a first optical property of said first optical signal is varied according to a first function over the time, measuring a second optical property over the time of a first response signal returning from the optical device in response to the first optical signal and establishing a first result function of said second optical property in dependence of the first optical property of the first optical signal, coupling a second optical signal to the optical device, wherein the first optical property of said second optical signal is varied according to a second function of the time that is different from the first function over the time, measuring the second optical property over the time of a second response signal returning from the optical device in response to the second optical signal and establishing a second result function of said second optical property in dependence of the first optical property of the second optical signal, and determining the physical state based on a combination of the first and the second result functions, wherein a combination of the first and the second result functions is performed by determining a first center value of at least a part of the first function and a second center value of at least a part of the second function and determining a resulting center value in dependence of said first and second center values.

2. The method of claim 1, wherein said first and second function of time are chosen to describe each a substantially linear relation between the first optical property resulting in substantially constant variation speeds, wherein the variation speeds have the same absolute value and different signs and wherein the resulting center value is determined by the average of both the center values.

3. The method of claim 1, wherein said first and second function of time are chosen to describe each a substantially linear relation between the first optical property and the time resulting in substantially constant variation speeds, wherein the variation speeds have the same absolute value and different signs and wherein the resulting center value is determined by superimposing both first and second measurements results and determining the center value of the superimposed measurements.

4. The method of claim 1, wherein said first and second function of time describe each a substantially linear relationship between the first optical property and the time resulting in substantially constant variation speeds and wherein the resulting center value is determined according to the following equation:

$$GR = \frac{C2 \cdot G1 - C1 \cdot G2}{C2 - C1}.$$

5. The method of claim 1, wherein a comparison is carried out between the resulting center value and a reference center value derived from known reflection characteristics of the optical device at a reference physical state.

6. The method of claim 5, wherein the physical state is determined by evaluating the difference between the resulting center value and the reference center value and wherein the physical state is determined in dependence of the reference physical state and the distance between said centers.

7. The method of claim 1, wherein at least one of: the first center value, the second center value and the resulting center value is determined by evaluating two intersection points of the corresponding function of the second optical property over the first optical property and a horizontal line describing a defined constant value over the first optical property and further determining the mid-point between said intersection points.

8. The method of claim 1, wherein at least one of: the first center value, the second center value and the resulting center value is determined by evaluating the center of mass of that part of the corresponding function of the second optical property over the first optical property, that is above a horizontal line describing a defined constant value over the first optical property.

9. The method of claim 1, wherein at least one of: the first center value, the second center value and the resulting center value is determined by a convolution between a result function of the second optical property over the first optical property and a reference function.

10. The method of claim 1, wherein the first optical property is the wavelength of the first and second optical signal and the second optical property is the power of the signals returned from the optical device.

11. The method of claim 10, wherein the optical device is one of: a Fiber Bragg Grating, a Fabry Perot Interferometer, or a Michelson Interferometer.

12. The method of claim 1, wherein the physical state is one of: the temperature, the pressure, the strain and the mechanical force.

13. A evaluation unit for determining a physical state of an optical device, comprising
a first input for receiving first optical property information about each of a first and a second optical signal coupled to a optical device,
a second input for receiving second optical property information about each of a correspondingly first and a second returned optical signals from the optical device,
a processing unit for relating the first optical property information and the second optical property information to each other into a result function for each of the optical signals, and determining a resulting center value based on the first and the second result functions.

14. A measurement setup for determining a physical state of an optical device, comprising:
a tunable light source for emitting a first optical signal and a second optical signal, each having an optical property variation over the time,
an optical device for receiving said first optical signal and said second optical signal, and returning corresponding first and second response signals,
an optical detector for determining optical power of the first and second response signals,
optical guides for optically connecting each of the tunable light source and the optical detector to the optical device, and
an evaluation unit having:
a first input for receiving first optical property information about each of said first and second optical signals,
a second input for receiving second optical property information about each of said first and a second response signals, and
a processing unit for relating the first optical property information and the second optical property information to each other into a result function for each of the optical signals, and determining a resulting center value based on the first and the second result functions wherein said evaluation unit is connected to the tunable light source for receiving the first optical property information, and to the optical detector for receiving the second optical property information.

15. A software program or product stored on a data carrier, for executing in an evaluation unit the following steps, when run on a data processing system such as a computer:

receiving first information about a first optical property of at least two emitted optical signals, receiving second information about a second optical property of two detected corresponding signals returned from an optical device, relating the first and the second information to each other into a result function for each of the optical signals, and determining a resulting center value based on the first and the second result functions.

* * * * *